United States Patent
Potter

(10) Patent No.: US 9,061,572 B2
(45) Date of Patent: Jun. 23, 2015

(54) PERIMETER SEAL FOR VEHICLE TONNEAU COVER

(71) Applicant: Dennis Jay Potter, Twin Falls, ID (US)

(72) Inventor: Dennis Jay Potter, Twin Falls, ID (US)

(*) Notice: Subject to any disclaimer, the term of this patent is extended or adjusted under 35 U.S.C. 154(b) by 0 days.

(21) Appl. No.: 14/051,773

(22) Filed: Oct. 11, 2013

(65) Prior Publication Data

US 2015/0102628 A1    Apr. 16, 2015

(51) Int. Cl.
*B60J 7/10*    (2006.01)

(52) U.S. Cl.
CPC ........................................ *B60J 7/104* (2013.01)

(58) Field of Classification Search
CPC ............... B60J 7/10; B60J 7/102; B60J 7/104
USPC ............................. 296/100.15, 100.16, 100.18
See application file for complete search history.

(56) References Cited

U.S. PATENT DOCUMENTS

| | | |
|---|---|---|
| 578,522 A | 3/1897 | Pretjsser |
| 3,167,825 A | 2/1965 | Zoller |
| 3,167,856 A | 2/1965 | Zoller |
| 3,367,347 A | 2/1968 | Smith |
| 3,547,515 A | 12/1970 | Shanok |
| 4,010,573 A | 3/1977 | Andrzejewski |
| 4,042,741 A | 8/1977 | Bright |
| 4,105,814 A | 8/1978 | Eggert |
| 4,126,351 A | 11/1978 | Peteretti |
| 4,232,081 A | 11/1980 | Pullan |
| 4,339,860 A | 7/1982 | Hayashi |
| 4,355,448 A | 10/1982 | Ezaki |
| 4,411,941 A | 10/1983 | Azzola |
| 4,432,166 A | 2/1984 | Weimar |
| 4,617,220 A | 10/1986 | Ginster |
| 4,639,033 A | 1/1987 | Wheatley et al. |
| 4,643,923 A | 2/1987 | Bernitz et al. |
| 4,647,103 A | 3/1987 | Walblay |
| 4,695,499 A | 9/1987 | Whitener |
| 4,699,837 A | 10/1987 | Bright |
| 4,739,528 A | 4/1988 | Allen |
| 4,745,016 A | 5/1988 | Hashimoto et al. |
| 4,792,179 A | 12/1988 | Stevens |
| 4,830,898 A | 5/1989 | Smith |
| 4,848,828 A | 7/1989 | Hunt |
| 4,948,191 A | 8/1990 | Cao |
| 4,952,442 A | 8/1990 | Warner |
| 4,982,529 A | 1/1991 | Mesnel |
| 5,058,652 A * | 10/1991 | Wheatley et al. ............. 160/327 |
| 5,085,006 A | 2/1992 | Hayashi et al. |
| 5,121,960 A | 6/1992 | Wheatley |
| 5,152,574 A | 10/1992 | Tucker |
| 5,251,951 A | 10/1993 | Wheatley |
| 5,275,458 A | 1/1994 | Barben et al. |
| 5,431,474 A | 7/1995 | Burkey |
| 5,472,256 A | 12/1995 | Tucker |
| 5,487,585 A * | 1/1996 | Wheatley ................. 296/100.18 |
| 5,540,475 A | 7/1996 | Kersting et al. |
| 5,655,808 A | 8/1997 | Wheatley |

(Continued)

OTHER PUBLICATIONS

Undated Trim-Lok Sewable Upholstery Trim brochure (at least as early as Jul. 2013).

*Primary Examiner* — Jason S Morrow

(57) ABSTRACT

A tonneau cover system for a cargo area of a vehicle. The system may comprise a flexible cover mounted to a main support frame. The flexible cover may include a J-clip for matingly engaging a cantilevered male portion extending from the rails of the support frame.

18 Claims, 28 Drawing Sheets

(56) References Cited

U.S. PATENT DOCUMENTS

| | | | |
|---|---|---|---|
| 5,752,345 A | 5/1998 | Bright et al. | |
| 5,788,315 A | 8/1998 | Tucker | |
| 5,860,691 A | 1/1999 | Thomsen et al. | |
| 5,934,735 A * | 8/1999 | Wheatley | 296/100.01 |
| 6,024,402 A * | 2/2000 | Wheatley | 296/100.18 |
| 6,224,139 B1 | 5/2001 | Weyand | |
| 6,527,318 B2 | 3/2003 | Kolper | |
| 6,619,719 B1 | 9/2003 | Wheatley | |
| 6,726,978 B2 | 4/2004 | Sehr | |
| 6,889,985 B2 | 5/2005 | Bonds | |
| 7,384,090 B1 | 6/2008 | Weldy | |
| 7,604,282 B2 | 10/2009 | Spencer et al. | |
| 7,621,582 B2 | 11/2009 | Schmeichel et al. | |
| RE41,078 E | 1/2010 | Schmeichel | |
| 7,735,881 B2 | 6/2010 | Steffens et al. | |
| 7,815,239 B1 | 10/2010 | Schmeichel et al. | |
| 7,828,361 B1 | 11/2010 | Spencer | |
| 7,905,536 B2 | 3/2011 | Yue | |
| 7,954,876 B2 | 6/2011 | Kosinski | |
| 7,963,585 B2 | 6/2011 | Jones et al. | |
| 2002/0109371 A1* | 8/2002 | Wheatley | 296/100.18 |
| 2007/0057528 A1 | 3/2007 | Fox et al. | |
| 2011/0169296 A1* | 7/2011 | Schrader et al. | 296/100.15 |

* cited by examiner

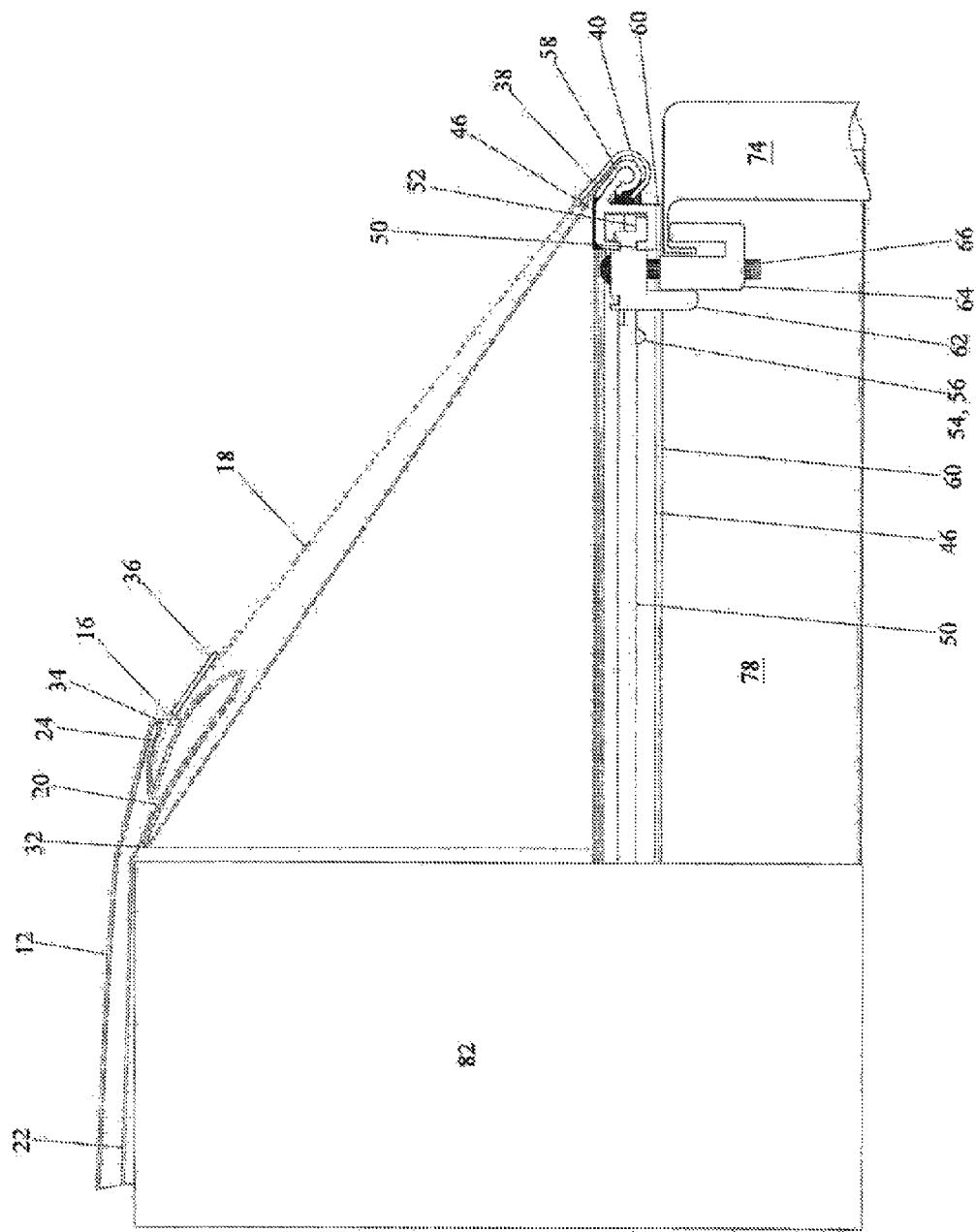

PERIMETER SEAL FOR VEHICLE TONNEAU COVER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Present Disclosure

The present disclosure relates generally to cover systems for cargo areas of vehicles, and more particularly, but not necessarily entirely, to tonneau cover systems for vehicles.

2. Description of Related Art

Vehicle and trailer manufacturers supply various models of trailers and vehicles that have open beds on which to place cargo for transit. Such vehicle and trailer beds typically have limited or no method of protecting cargo from the weather, water or debris. Furthermore, such vehicle and trailer beds typically have a limited or no method of securing cargo from movement.

Originally if cargo needed to be protected from the weather, water or debris it was covered with a waterproof tarp. However, tarp users objected to the bulky and awkward to handle nature of tarps. Tarps can come loose at high speeds and flap away from the cargo they protect, thereby allowing the cargo to come in contact with the weather, water or debris. Additionally, the cargo and tarps had to be secured using separate strapping, cords or rope, which can be equally awkward to handle.

Thereafter, several types of vehicle bed enclosures were designed to cover the bed in such a way that small cargo could be protected from the weather. U.S. Pat. No. 7,963,585 to Jones discloses a tonneau cover system which can cover the vehicle bed. However, this tonneau cover limits the size of cargo that can be protected from the weather. Cargo larger than the height of the vehicle or trailer bed walls cannot be transported while this tonneau system is in use.

U.S. Pat. No. 7,828,361 to Spencer discloses a tonneau cover that is of expensive construction, with many specially manufactured parts and is limited in its ability to keep water and weather off the cargo. Furthermore, this design uses a hook and loop fastener to secure the tonneau fabric to the frame. Over time, this hook and loop fastening system will lose its ability to fasten the tonneau fabric to the frame. Additionally, this hook and loop fastening systems does not adequately keep water from entering the cargo bed. When a vehicle or trailer is traveling at high speeds, air pressure will force water to migrate through the hook and loop fastening system into the covered vehicle bed thusly, exposing the cargo to moisture.

U.S. Pat. No. 7,604,282 B2 to Spencer shows a tonneau cover rail system that is used to attach the tonneau cover to a truck bed wall. Unfortunately, this tonneau cover rail system protrudes into the cargo space of the vehicle bed and limits the vehicles cargo storage capacity.

U.S. Pat. RE41,078 to Schmeichel discloses a tonneau cover tension adjuster apparatus. However, this design incorporates a complicated and expensive construction tonneau cover tension adjuster which is prone to mechanical failure. Additionally, this design requires manual adjustment to the proper tension.

Several other types of tonneau systems and cargo covers have been proposed—for example, U.S. Pat. No. 7,735,881 to Steffens, U.S. Pat. No. 7,621,582 to Schmeichel, U.S. Pat. No. 7,815,239 to Schmeichel, and U.S. Pat. No. 7,905,536 to Yue. Although all these designs have unique attributes, all tonneau covers hereto known suffer from a number of disadvantages and short comings:

(a) The fastening systems and methods used to connect the tonneau cover rail system to the bed are not adequate to keep moisture from entering the covered cargo space;

(b) The fastening systems wear with use and allow water to migrate into the bed cargo space;

(c) Existing tonneau covers systems cannot expand to cover loads larger than the height of vehicle or trailer bed walls;

(d) No tonneau product exists that can secure cargo from movement; and (e) Existing tonneau covers do not self-retract and tension to a flat position after a large cargo load has been removed.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIGS. 11A-11C show a longitudinal cross section of the components of the tonneau cover system;

DETAILED DESCRIPTION

Figure 1:
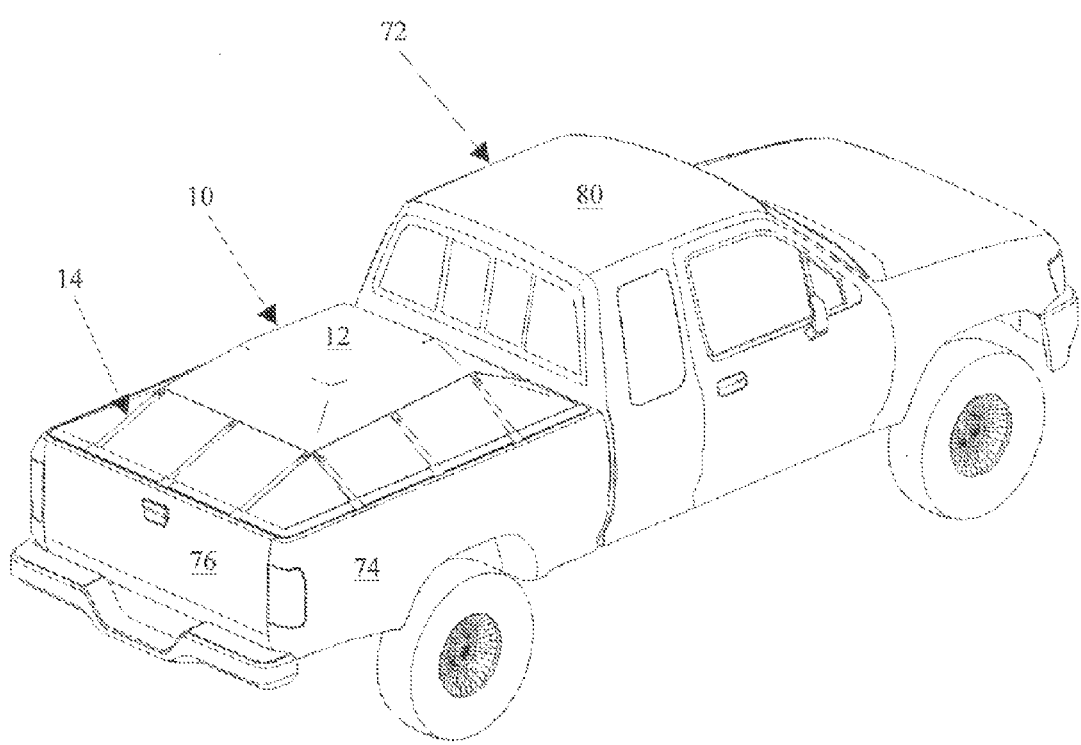
FIG. 1 shows an isometric view of a vehicle utilizing one embodiment of a tonneau cover expanded to fit over and restrain cargo within a vehicle bed.

For the purposes of promoting and understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "containing," "characterized by," and grammatical equivalents thereof are inclusive or open-ended terms that do not exclude additional, unrecited elements or method steps.

Figure 2:
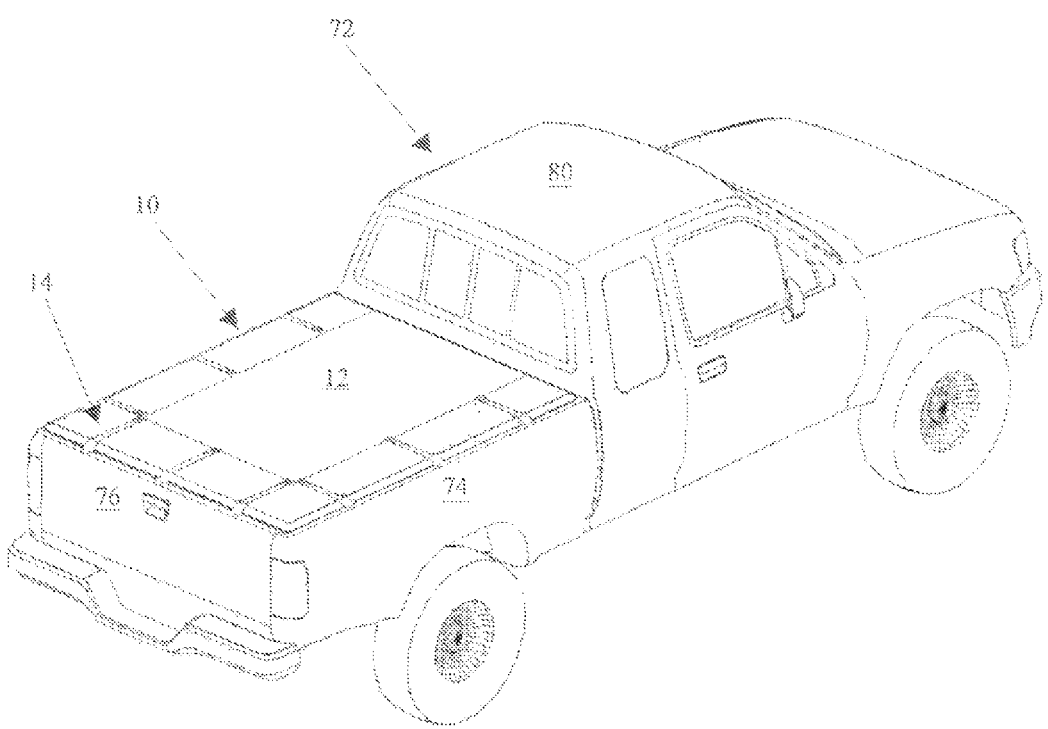
FIG. 2 shows an isometric view of a vehicle utilizing one embodiment of a tonneau cover collapsed and flat over a vehicle bed.

For description purposes herein, the terms "over", "under", "top", "bottom", "front", "rear", "left", "right" relate generally to the embodiment as oriented in FIGS. 1 and 2. It is understood that embodiments of the present invention may assume other various alternative orientations and sequences except where expressly specified to the contrary. Additionally, it is to be understood that the specific details and processes illustrated in the drawings and described in the specifications are simple exemplary embodiments. Hence, specific dimensions, other physical characteristics and materials relating to the embodiments disclosed herein are not to be considered as limiting, unless the claims expressly state otherwise.

Figure 3:
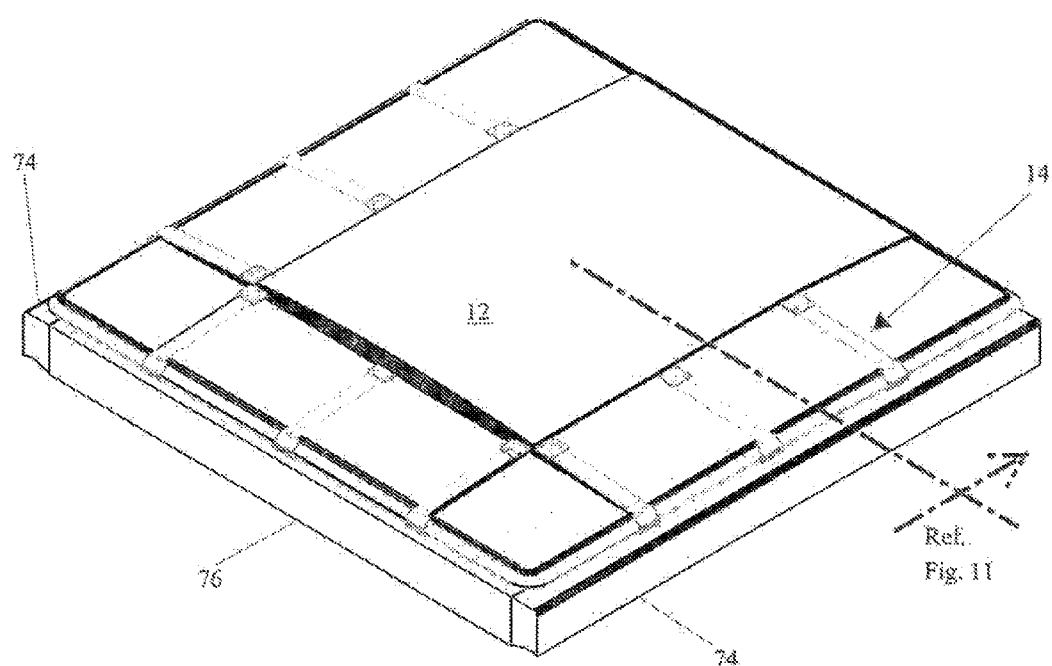
FIG. 3 shows an isometric view of the tonneau cover with components.

Referring now to FIGS. 1, 2, and 3, a water resistant tonneau cover system 10 having a flexible cover 12 is shown according to an embodiment of the present disclosure. The flexible cover 12 fits over and attaches to the top length of opposing vehicle cargo bed side walls 74. The flexible cover 12 fits the width of the vehicle cargo gate 76 and width of the vehicle cab cargo bed wall nearest the vehicle cab 80 covering the opening of the vehicle cargo bed (not shown) of a vehicle 72. In an embodiment, the flexible cover 12 is made of a material that is flexible, resilient, durable and water resistant.

In an embodiment, an exterior strap system 14 allows the flexible cover 12 to be manually tightened to prevent cargo from moving during transit. In addition, the exterior strap system 14 allows the flexible cover 12 to be operable between a collapsed position and an expanded position. In particular, as shown in FIG. 1, the flexible cover 12 may be expanded to cover and restrain cargo that is taller than the vehicle cargo bed side walls 74.

In FIG. 2, the flexible cover 12 may be collapsed flat with an empty vehicle cargo bed. Thus, it will be appreciated that the flexible cover 12 is operable between an expanded position as shown in FIG. 1 and a collapsed position as shown in FIG. 2. In FIG. 1, the exterior strap system 14 may be loosened to allow the flexible cover 12 to unfold to the expanded position. In FIG. 2, the exterior strap system 14 may be tightened to allow the flexible cover 12 to fold to the collapsed position.

Figure 4:
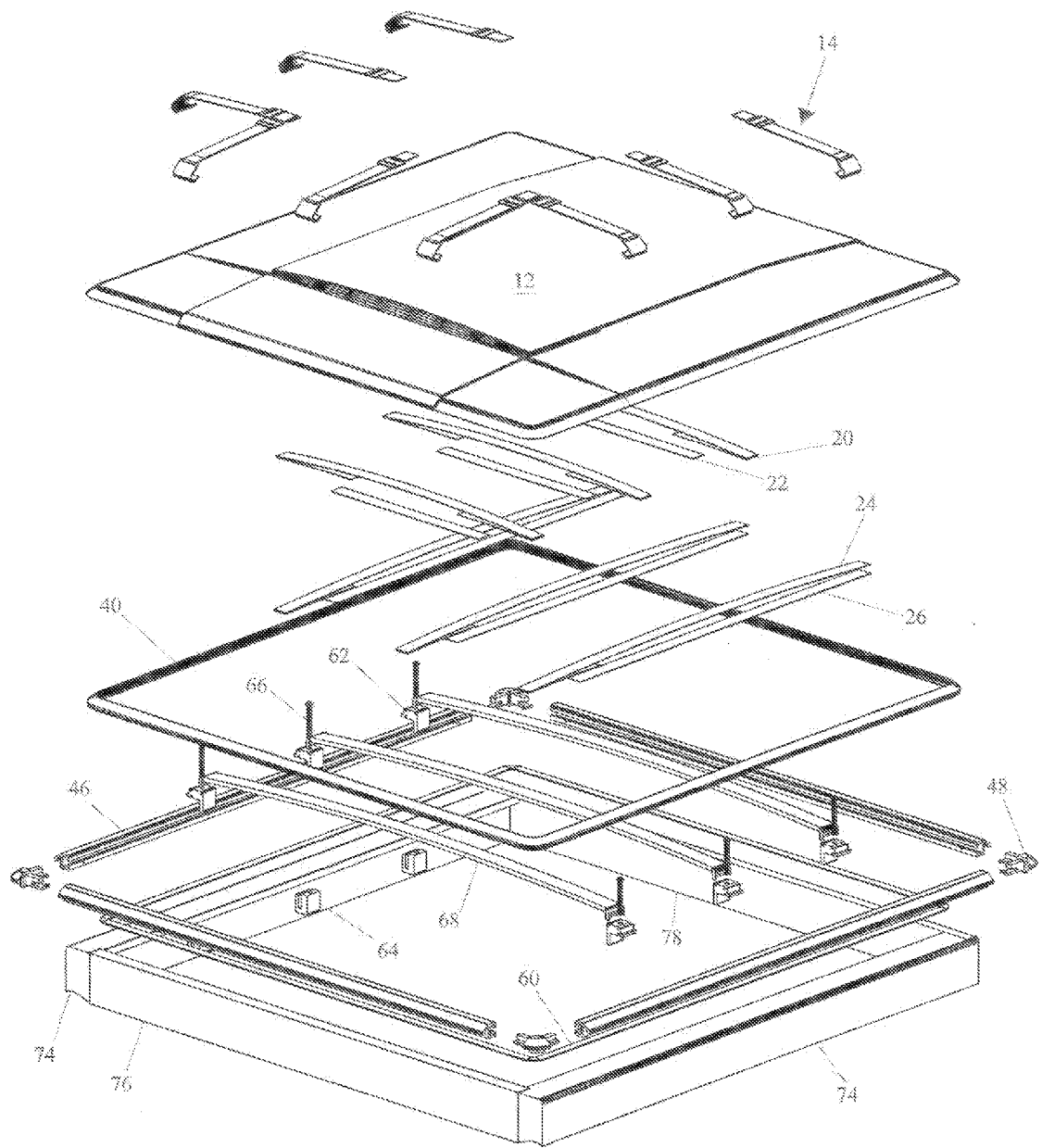
FIG. 4 shows an exploded isometric view of the components of the tonneau cover system.
Figure 5:
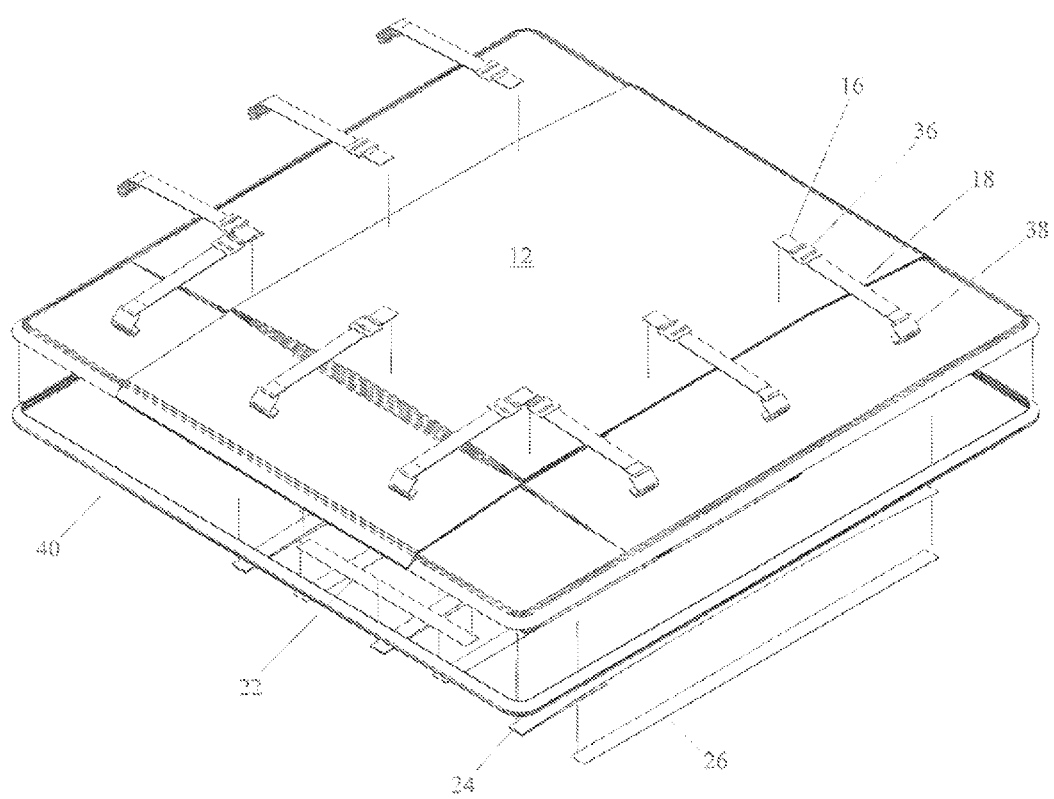
FIG. 5 shows an exploded isometric topside view of the components of the tonneau cover.
Figure 6:
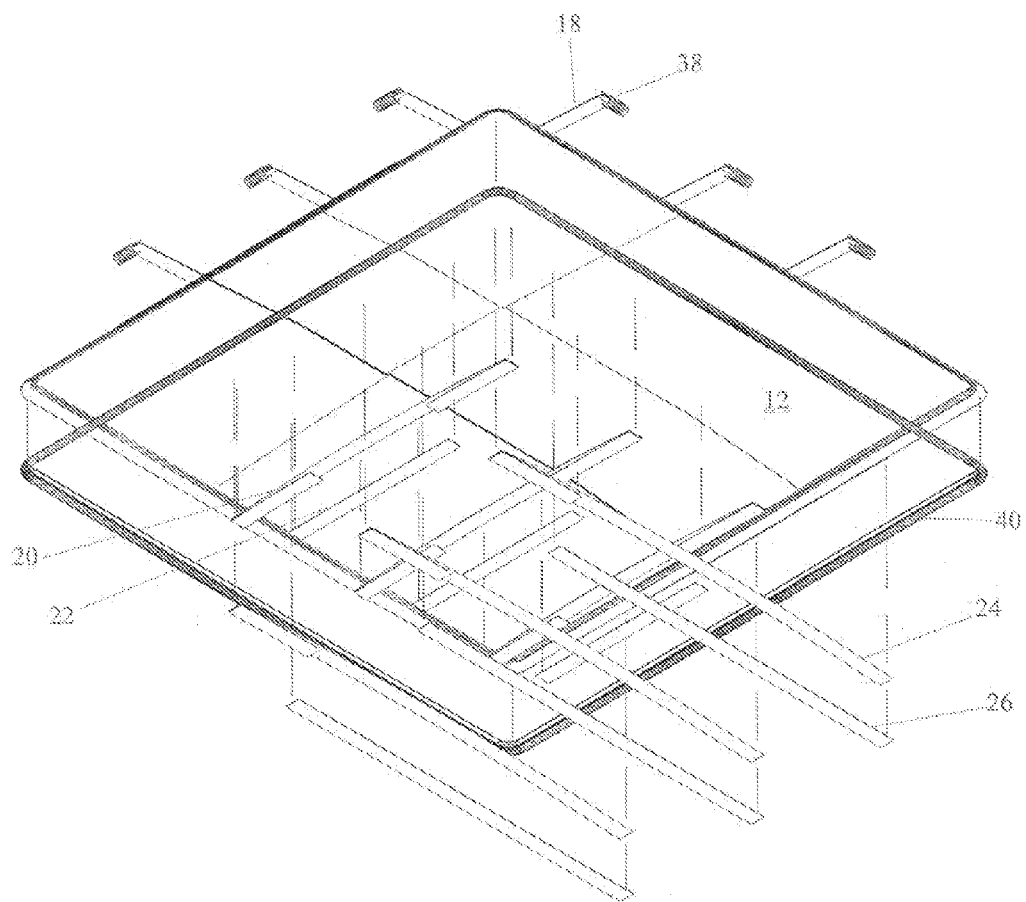
FIG. 6 shows an exploded isometric bottom-side view of the components of the tonneau cover.

Referring to FIGS. 4, 5 and 6, the exterior strap system 14 comprises a plurality of attachment straps 16 attached to the flexible cover 12. The attachment straps 16 may provide an attachment point to the flexible cover 12 for the non-working end of buckles 36. Looped through the working end of the buckles 36 are tightening straps 18 with flat hooks 38 attached at the ends. The hooks 38 may be secured to a side rail as will be explained in more detail below.

In an embodiment, the exterior strap system 14 may be manually expanded to cover cargo that may be taller than the vehicle cargo bed sidewalls 74 (see FIG. 1). The exterior strap system 14 may also be manually tightened to cinch down and restrain cargo that may be taller than the vehicle cargo bed sidewalls 74.

In an embodiment, latitudinal reinforcing straps 20 and longitudinal reinforcing straps 24 are attached to the underside of, and provide support to, the flexible cover 12. In an embodiment, latitudinal elastic tightening straps 22 and longitudinal elastic tightening straps 24 are attached, at specific locations to the flexible cover 12, in a manner that allows the tonneau cover system 10 to self-tension the flexible cover 12 over cargo that may be taller than vehicle cargo bed sidewalls 74.

That is, upon removal of cargo that may be taller than vehicle cargo bed side walls 74, the latitudinal elastic tightening straps 22 and longitudinal elastic tightening straps 26 self-tension and the attached flexible cover 12 collapses to a flat configuration.

Figure 11A:
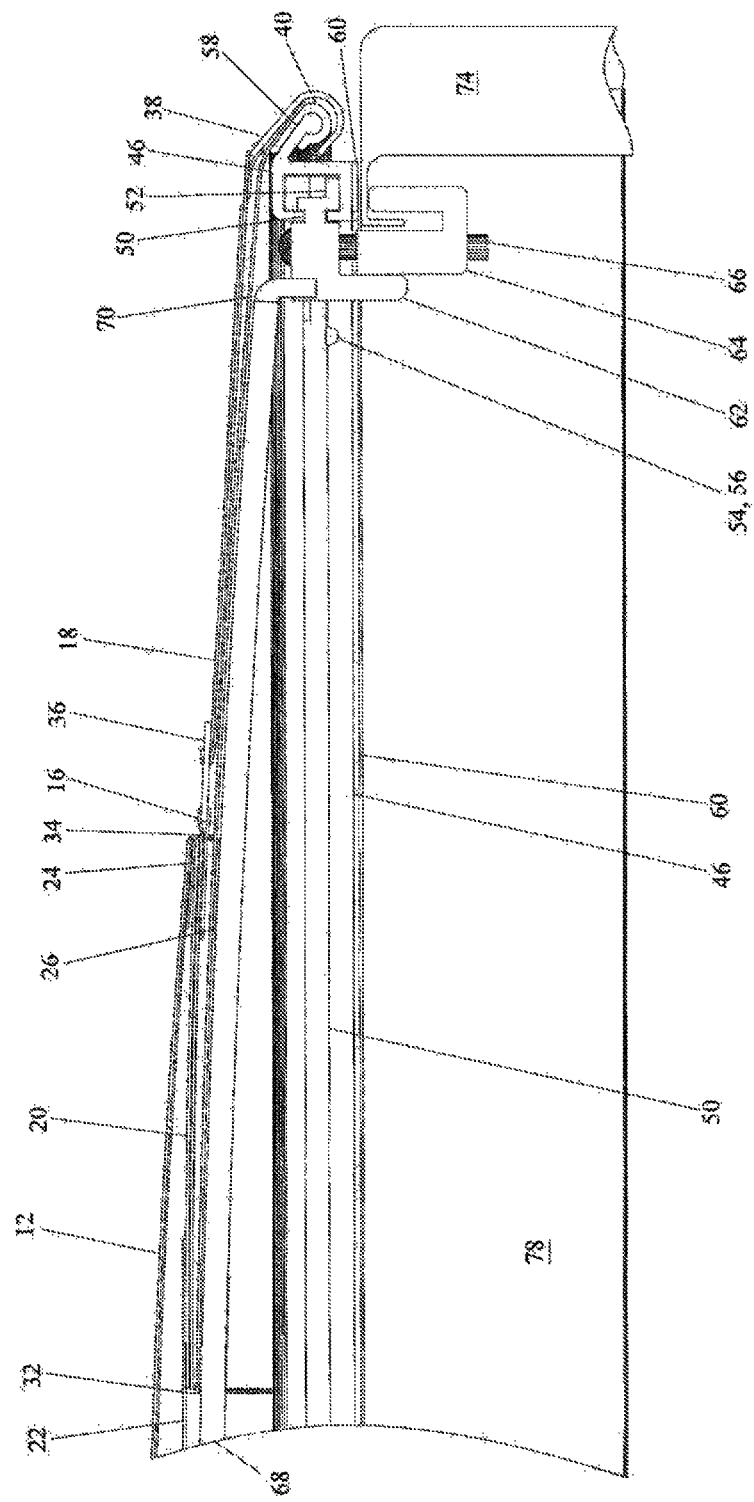

In an embodiment, attached around the perimeter of the flexible cover 12 is a friction fit seal 40 which acts to hold the tonneau cover to the rail frame 46 and rail frame corners 48, illustrated in FIG. 11A, and provide a weather, water and debris tight seal for the cargo.

Figure 7:
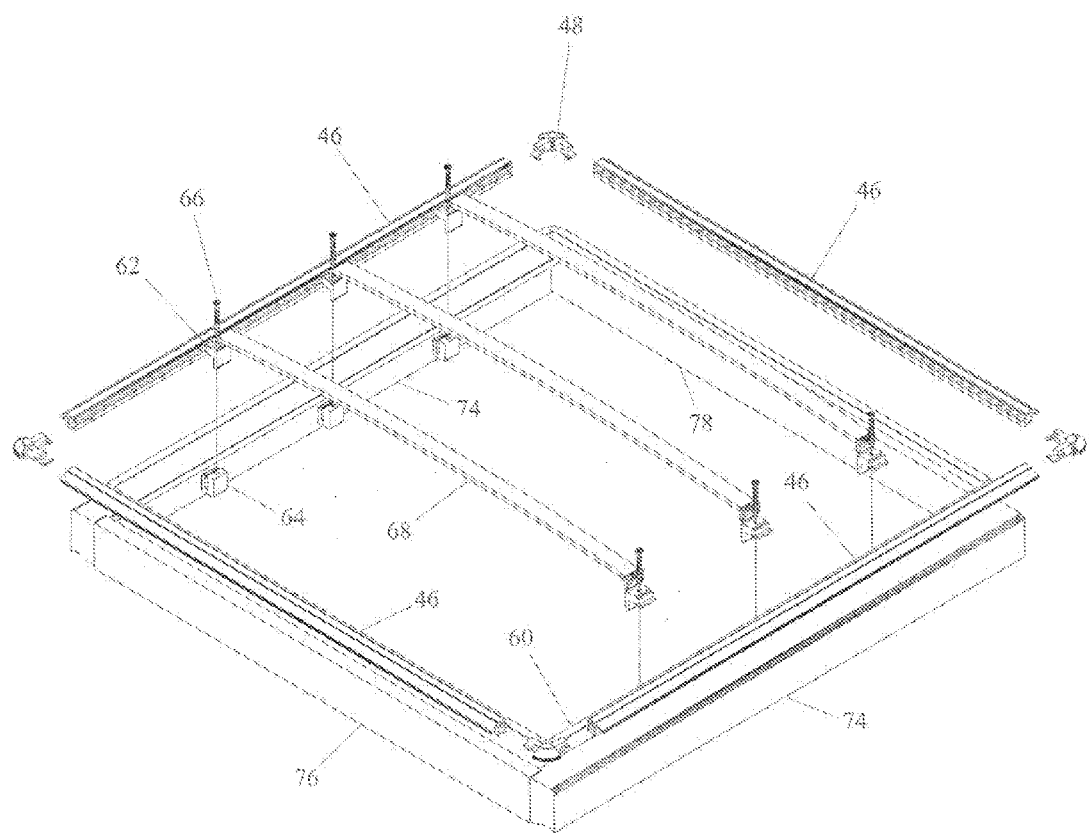
FIG. 7 shows an exploded isometric view of the components of the tonneau cover rail frame and bow system.

FIG. 7 illustrates, according to an embodiment of the present disclosure, how the flexible cover 12 of the tonneau cover system 10 attaches to a vehicle by use of an opposing set of rail frames 46 which are attached to the top of, and run the length of, the vehicle cargo bed sidewalls 74. Another opposing set of rail frames 46, run the width of the vehicle cargo gate 76 and vehicle cab cargo bed wall 78. The rail frames 46 connect to each other by way of rail frame corners 48.

In an embodiment, the rail frames 46 and rail frame corners 48 connect to the vehicle cargo bed sidewalls 74 using a set of upper clamps 62 and lower clamps 64 with socket screws 66. The lower clamps 64 are cored and tapped to receive the socket screws 66. The upper clamps 62 are cored to allow the socket screws 66 to pass through in order to thread into the lower clamps 64. Upon tightening socket screws 66, the lower clamps 64 act as a vice and move toward the upper clamps 62.

Figure 8:
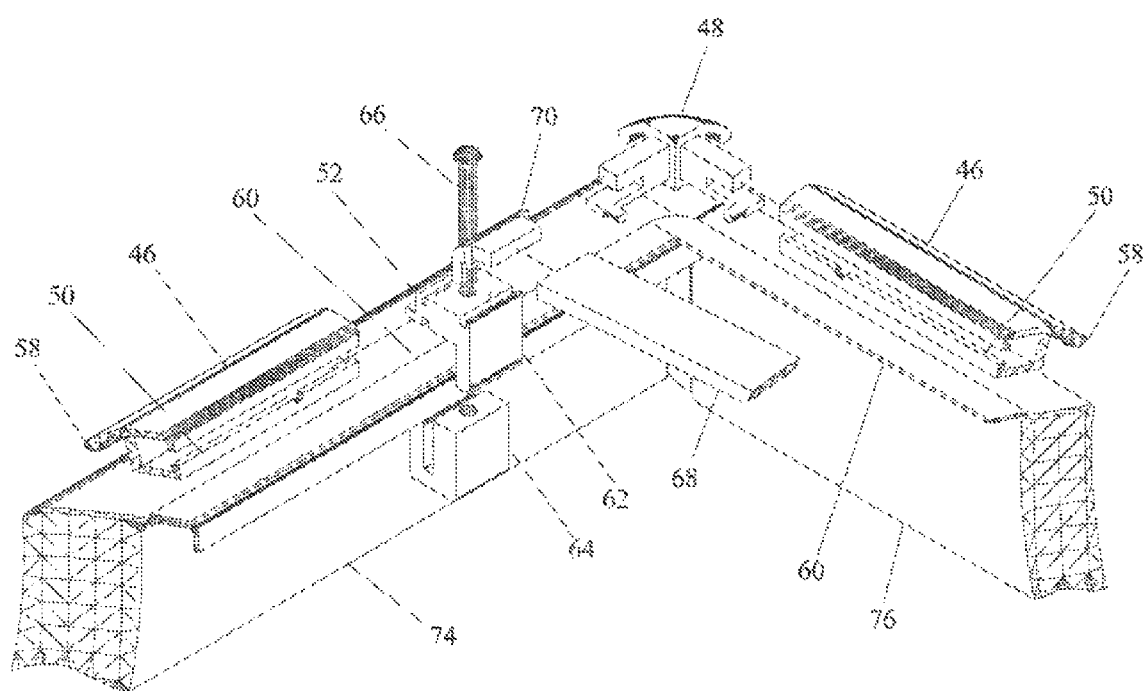
FIG. 8 shows the unattached components of the rail frame, rail frame corners and bow system.

Referring now to FIG. 8, the upper clamp's 62 rail frame attachment 52 slides into the rail frame's 46 upper clamp receiver 50. Upon tightening the socket screw 66, the upper clamp's 62 rail frame attachment 52 pushes down and clamps rail frame 46 onto the top of the vehicle cargo bed side walls 74, sandwiching and compressing gasket 60.

In an embodiment, bow ends 70 attach to the bows 68. The bow ends 70, with bows 68 attached, can slide down onto, and are received by, upper clamp 62. When no cargo is present to be carried by the vehicle 80, the assembled bows 68 and bow ends 70 may be installed onto upper clamp 62. When installed, bows 68 and bow ends 70 provide a structure that allows water, dust and debris to shed off the tonneau system 10.

Figure 9:
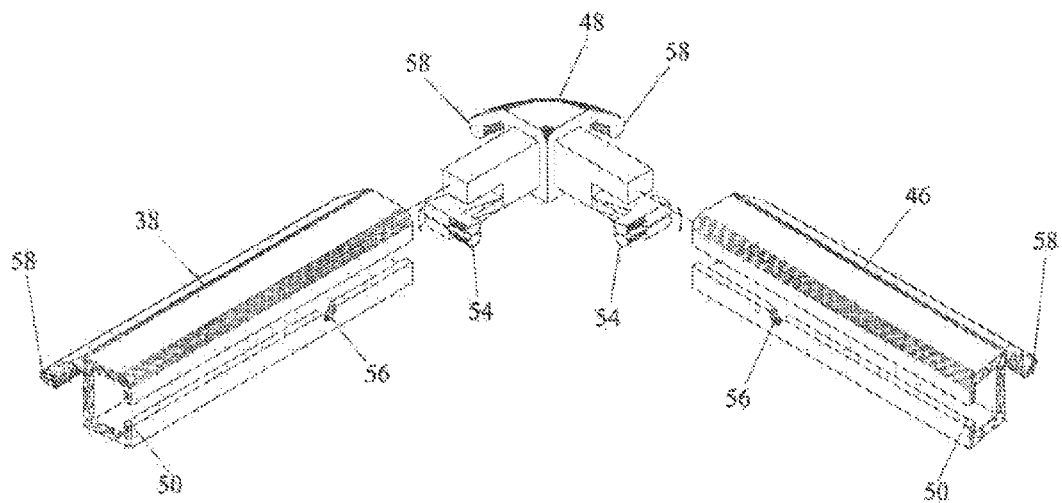
FIG. 9 shows the unattached components of the rail frame, rail frame corners and lift locks.
Figure 10:
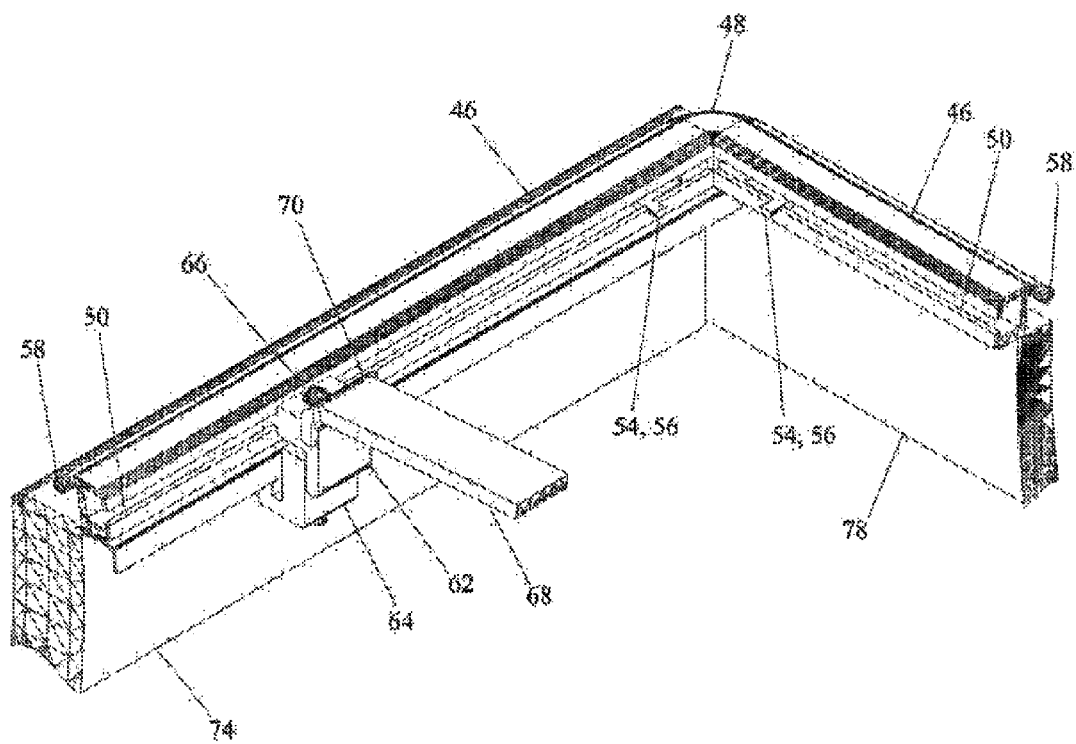
FIG. 10 shows the attached components of the rail frame, rail frame corners and bow system.

Referring now to FIGS. 9 and 10, there is illustrated the rail frame corners 48 attaching to and locking by way of lift locks 54 into rail frame receivers 56 of rail frames 46. In an embodiment, the rail frame corners 48 are made of sufficiently rigid yet flexible material that allows the lift locks 54 to be lifted. To assemble, the lift locks 54 are lifted to slide the rail corners 48 into rail frames 46. Once the rail corners 48 are slid into place, the lift locks 54 return to their normal flat position resting into lift lock receiver 56.

Figure 11B:
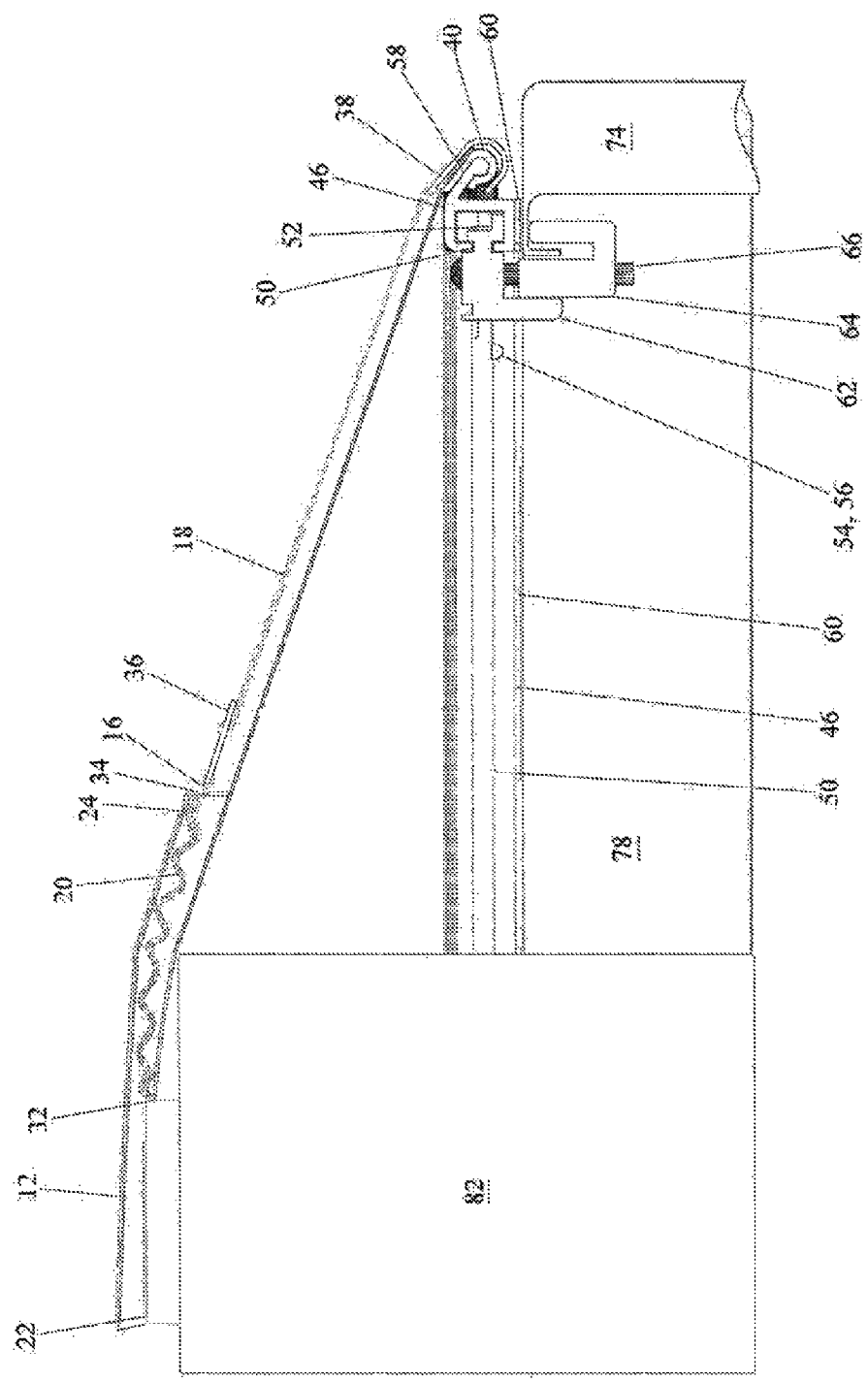

Referring to FIG. 11A-11C, there is shown a latitudinal cross section of the complete tonneau system 10 attached to the vehicle cargo bed side wall 74 and vehicle cab cargo bed wall 78 with bows 68 and bow ends 70 installed. FIG. 11A depicts the tonneau system 10 with the flexible cover 12 in a collapsed position. FIG. 11B depicts the tonneau system 10 with the flexible cover 12 in a partially unfolded to an expanded position when a cargo 82 is placed in the cargo area. FIG. 11C depicts the tonneau system 10 with the flexible cover 12 in an unfolded to a fully expanded position when the cargo 82 is placed in the cargo area.

In an embodiment, the socket screws 66 are partially tightened in order to demonstrate the gasket 60 in an uncompressed state between rail frames 46 and vehicle cargo bed side wall 74. The flat hooks 38 are shown manually tightened to the friction fit seal 40 and friction fit male adapter 58 by manually tightening the manual tightening strap 18. The manual tightening strap 18 may provide manual tension to flexible cover 12.

Figure 12:
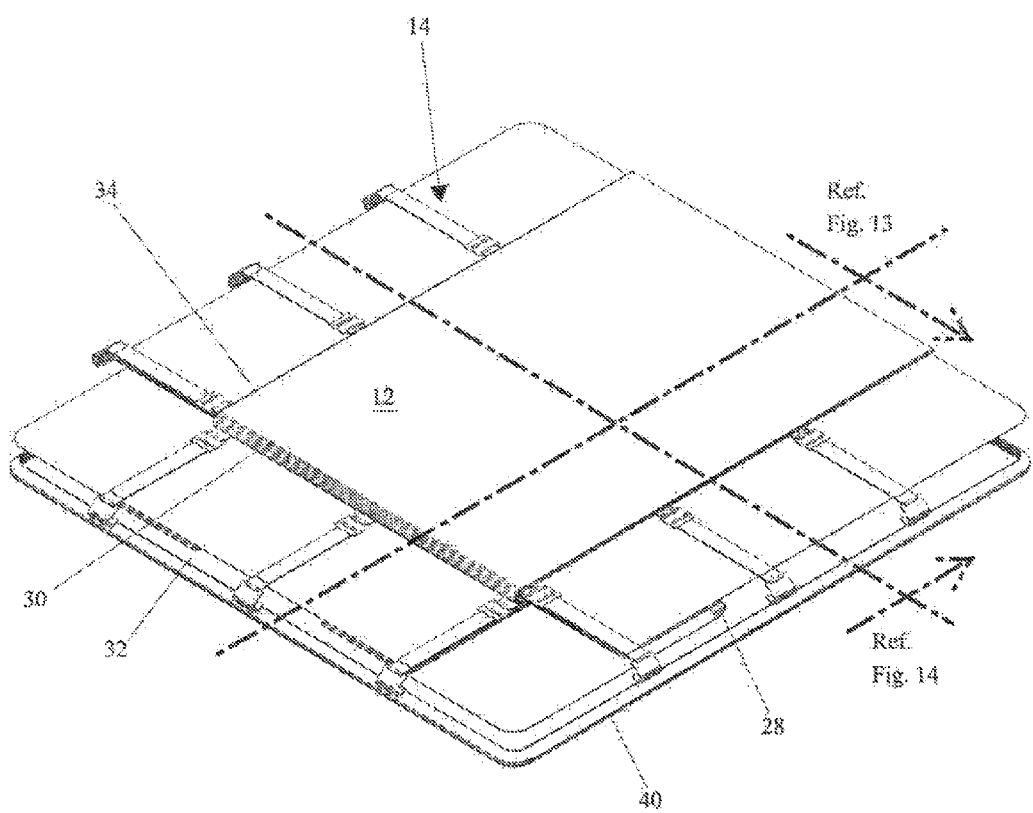
FIG. 12 shows an isometric view of a flat tonneau cover without the friction fit seal attached.

Referring now to FIG. 12, there is illustrated the flexible cover 12 in a collapsed position without the support of the bows 68. The friction fit seal 40 is shown detached for clarity. Internal latitudinal folds 28, external latitudinal folds 30, internal longitudinal folds 32 and external longitudinal folds 34 are incorporated to allow the flexible cover 12 to unfold to an expanded position when cargo is taller than the vehicle cargo bed side walls 74.

Figure 13:
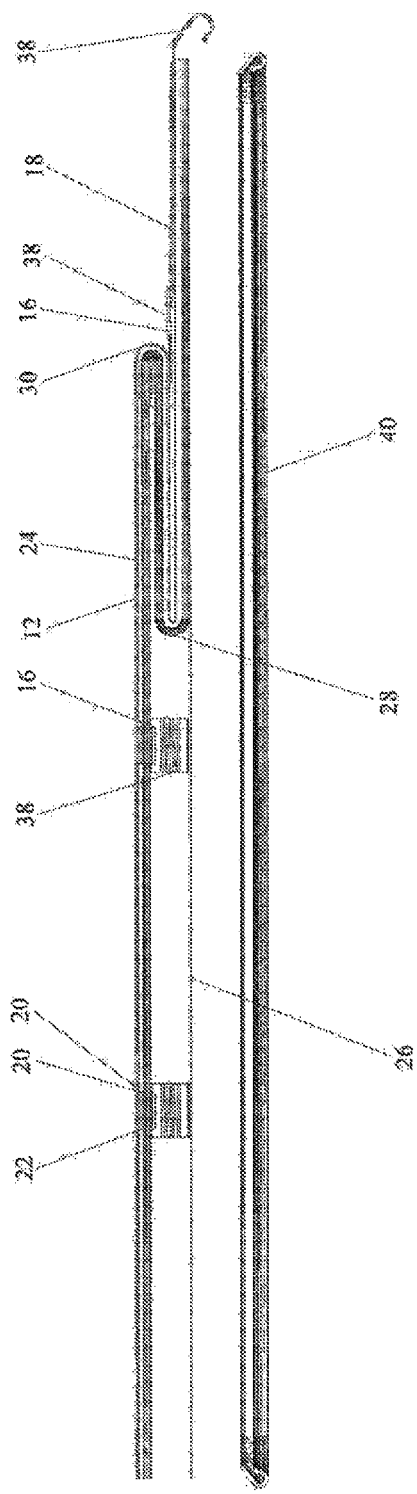
FIG. 13 shows a longitudinal side view of the tonneau cover folds without the friction fit seal attached.
Figure 14:
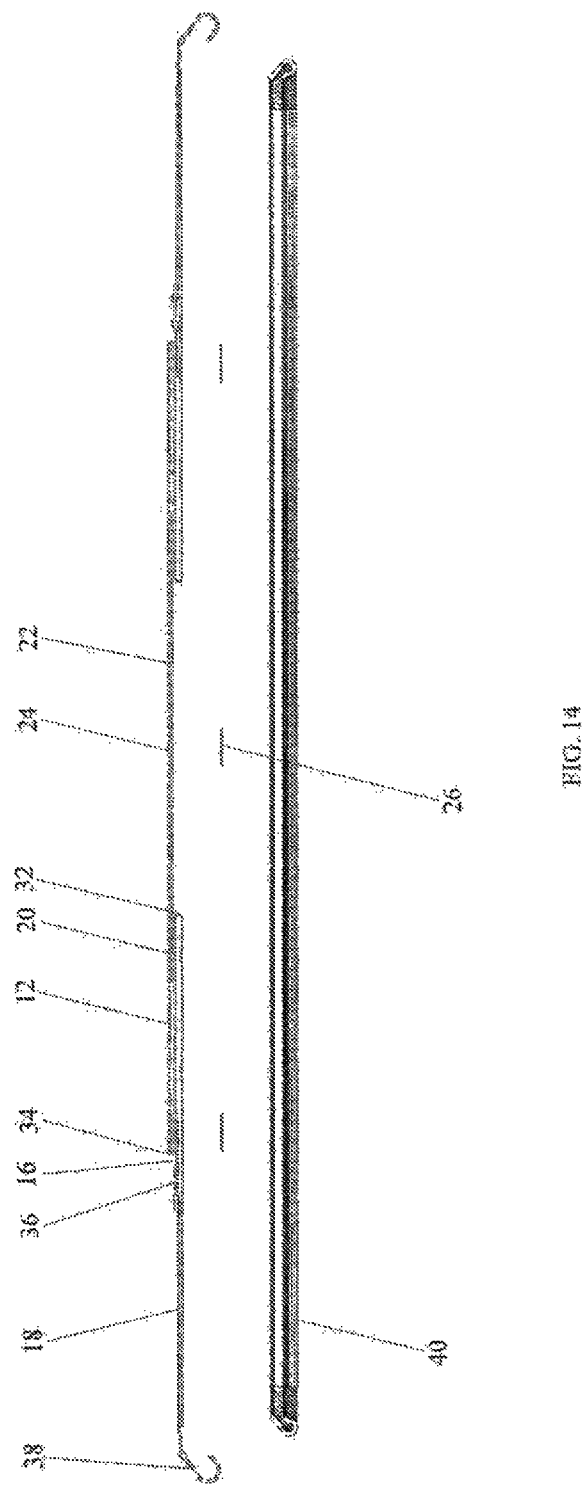
FIG. 14 shows a latitudinal side view of the tonneau cover folds without the friction fit seal attached.

Referring now to FIGS. 13 and 14, there is illustrated a longitudinal cross section and latitudinal cross section of the collapsed flexible cover 12 without the support of the bows 68. The friction fit seal 40 is shown detached for clarity. When cargo is not present, the longitudinal elastic tightening straps 26 and the latitudinal elastic tightening straps 22 self-tension and pull the flexible cover 12 to a flat and tight position. The internal latitudinal folds 28, external latitudinal folds 30, internal longitudinal folds 32 and external longitudinal folds 34 may allow the excess flexible cover 12 to be taken up and lay flat.

Figure 15:
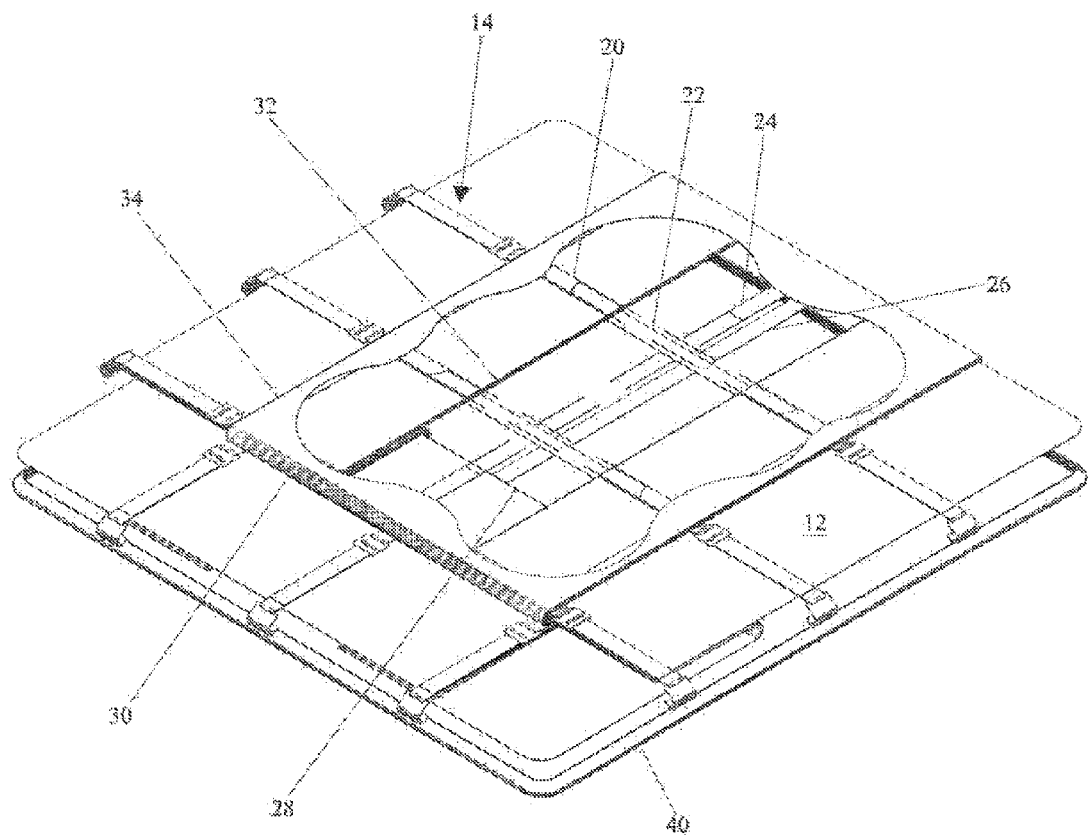
FIG. 15 shows an isometric view of the flat tonneau cover with internal parts exposed and without the friction fit seal attached.

Referring now to FIG. 15, there is illustrated the collapsed flexible cover 12 without the support of the bows 68. The friction fit seal 40 is shown detached for clarity. The internal parts are exposed for clarity.

Figure 16:
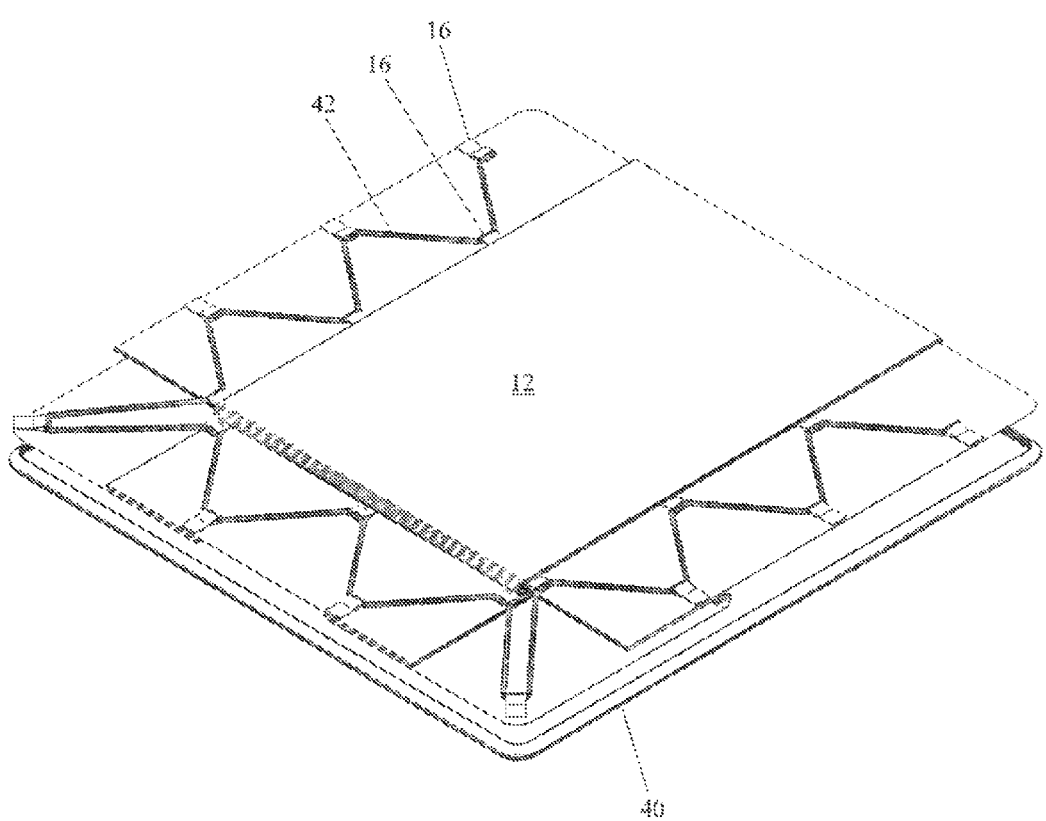
FIG. 16 shows an isometric view of the flat tonneau cover with an alternative method of strapping and without the friction fit seal attached.
Figure 17:
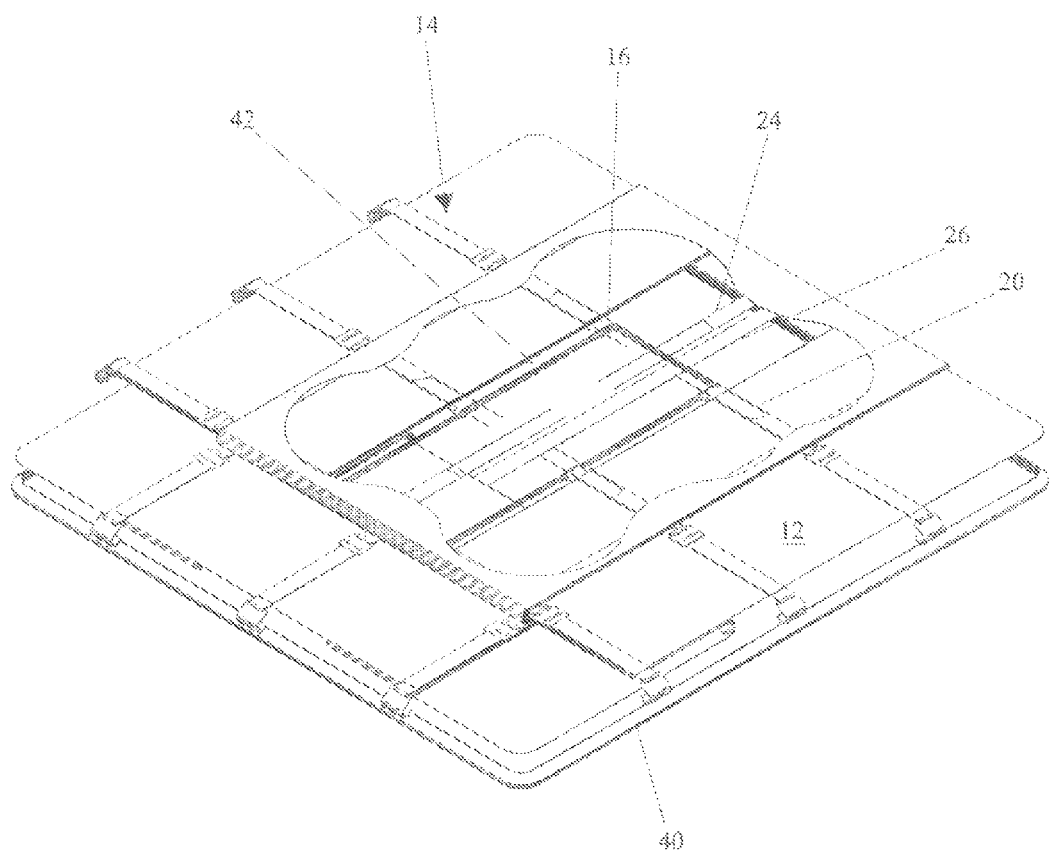
FIG. 17 shows an isometric view of the flat tonneau cover with and alternative method of internal parts exposed and without the friction fit seal attached.
Figure 18:
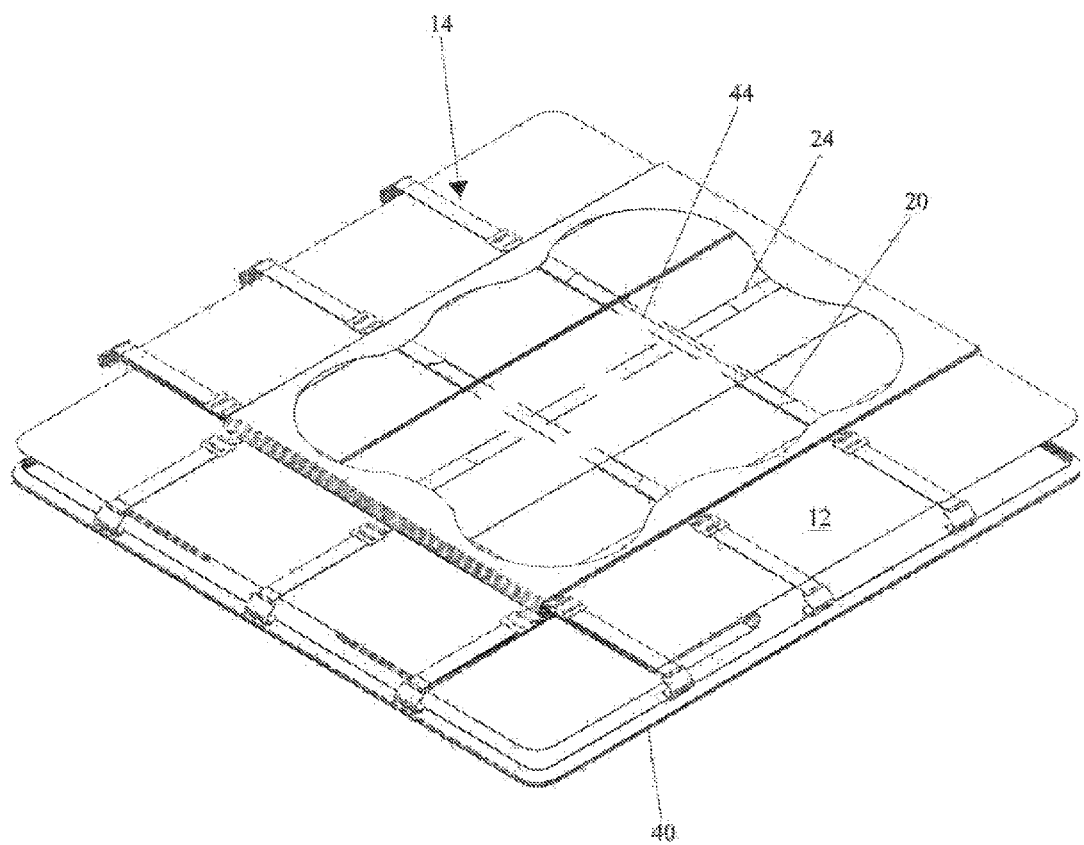
FIG. 18 shows an isometric view of the flat tonneau cover with and alternative method of internal parts exposed and without the friction fit seal attached.

Additional embodiments of the tonneau cover are illustrated in FIGS. 16-18. In particular, these figures show the collapsed flexible cover 12 without the support of the bows 68. The friction fit seal 40 is shown detached for clarity. These embodiments may incorporate cord 42 and/or elastic fabric 44 to self-tension the flexible cover 12.

Figure 19:
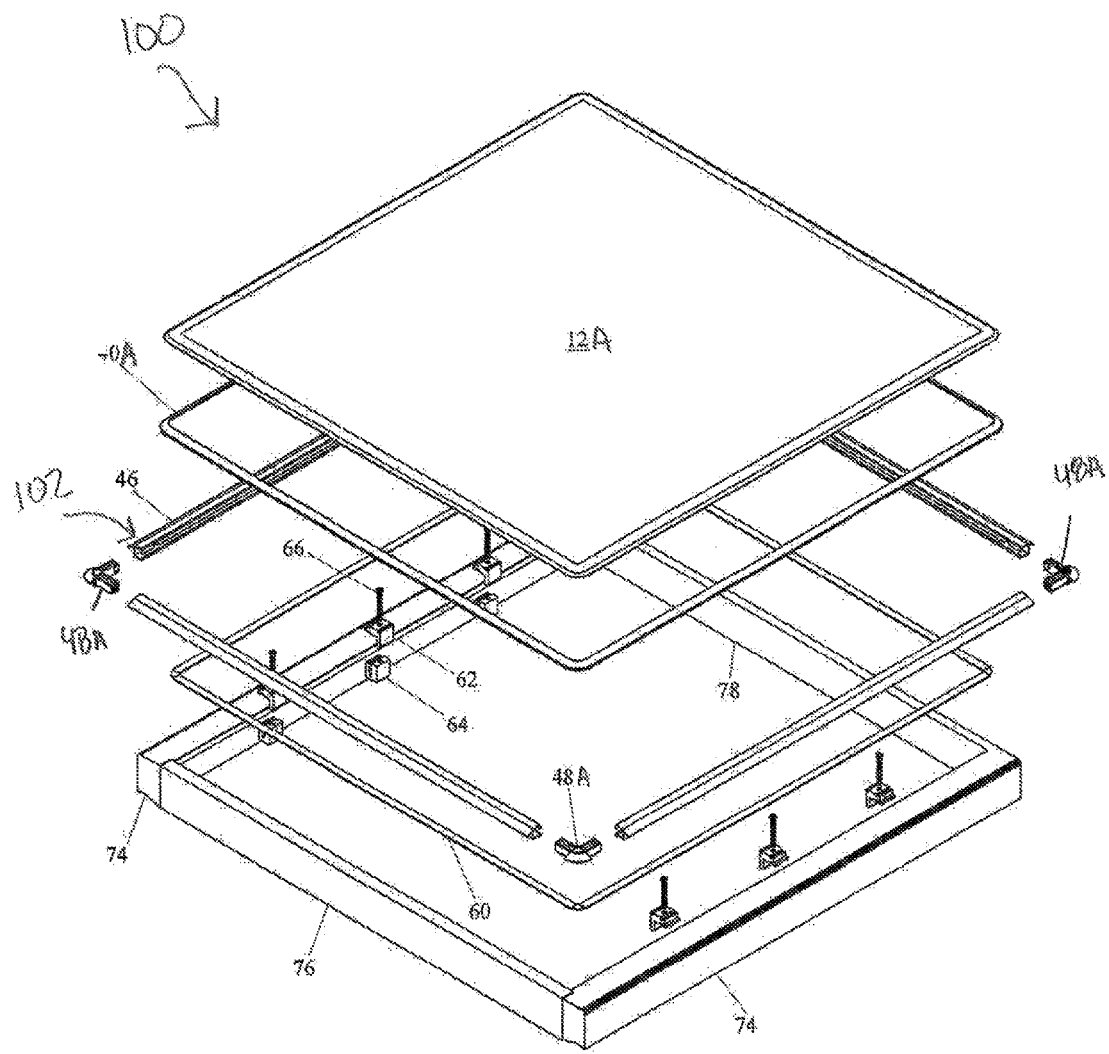
FIG. 19 shows an exploded, isometric view of a tonneau cover assembly and cargo bed of a vehicle according to an embodiment of the present disclosure.

Referring now to FIG. 19, there is shown an exploded view of a tonneau cover assembly 100 according to an embodiment of the present disclosure where like reference numerals depicts like components. The assembly 100 may include a tonneau cover 12A. The cover 12A may be secured to the walls 74, 76 of a cargo bed of a vehicle (not shown). In particular, a J-clip 40A may be coupled to the edges of the cover 12A around the entire perimeter of the cover 12A. That is, the J-clip 40A may be contiguous or continue without break around the entire perimeter of the cover 12A. The J-clip 40A, in turn, may be utilized to secure the cover 12A to a rail assembly 102. The rail assembly 102 may include rails 46 that are secured to the top of the walls 74, 76 of the cargo bed. Rail frame corners 48A may form corners for the rail assembly 102 as will be described in more detail below.

Figure 20:
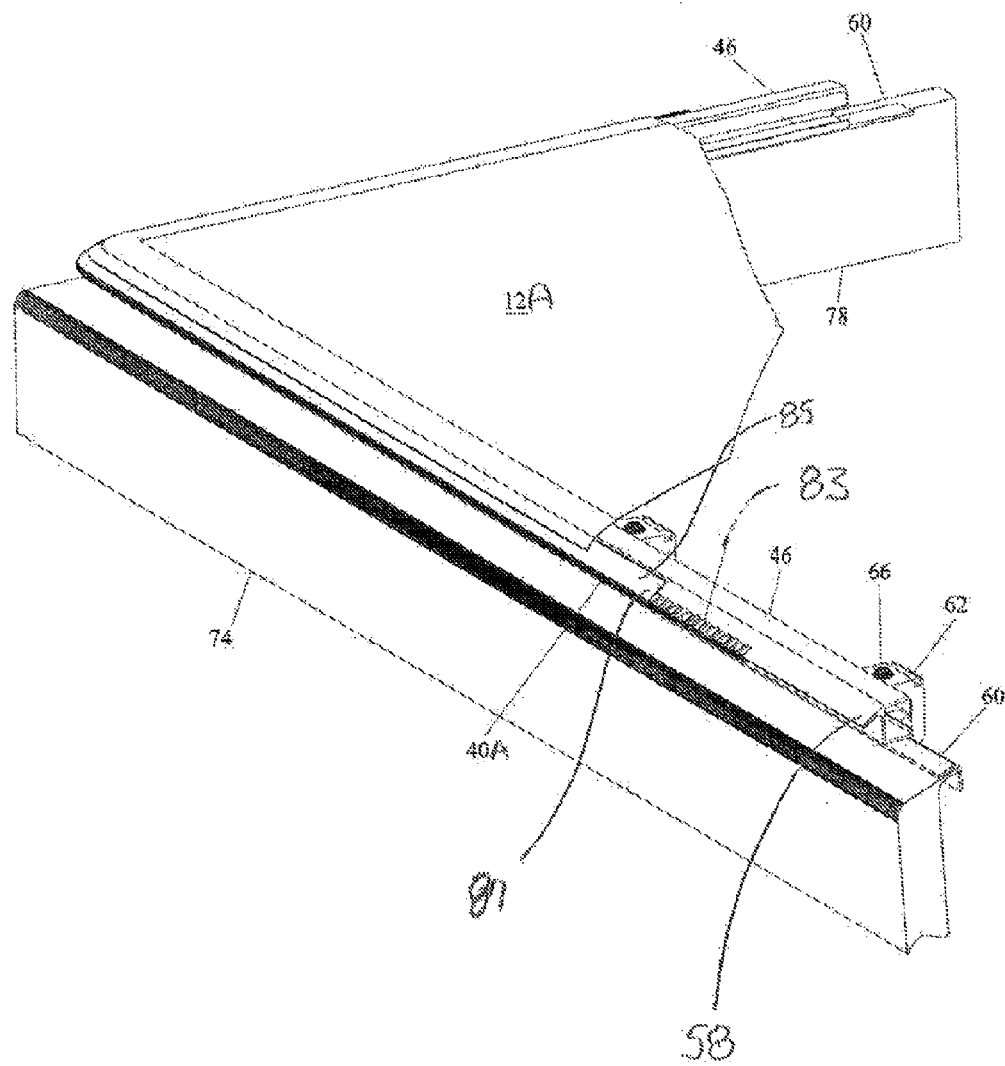
FIG. 20 is a partial, fragmentary view of the tonneau cover shown in FIG. 19 installed onto a cargo bed of a vehicle.

Referring now to FIG. 20, the J-clip 40A may engage a J-clip male portion 58 extending from the rails 46. The J-clip male portion 58 may be rigid and cantilevered. In particular, the J-clip male portion 58 may extend outwardly and downwardly at a slight angle from the rails 46. The J-clip 40A may engage the J-clip male portion 58 around the entire perimeter of the cargo bed of the vehicle to form a tight seal. In an embodiment, the J-clip male portion 58 may include a cantilevered edge that extends from the rails 46.

Figure 21:
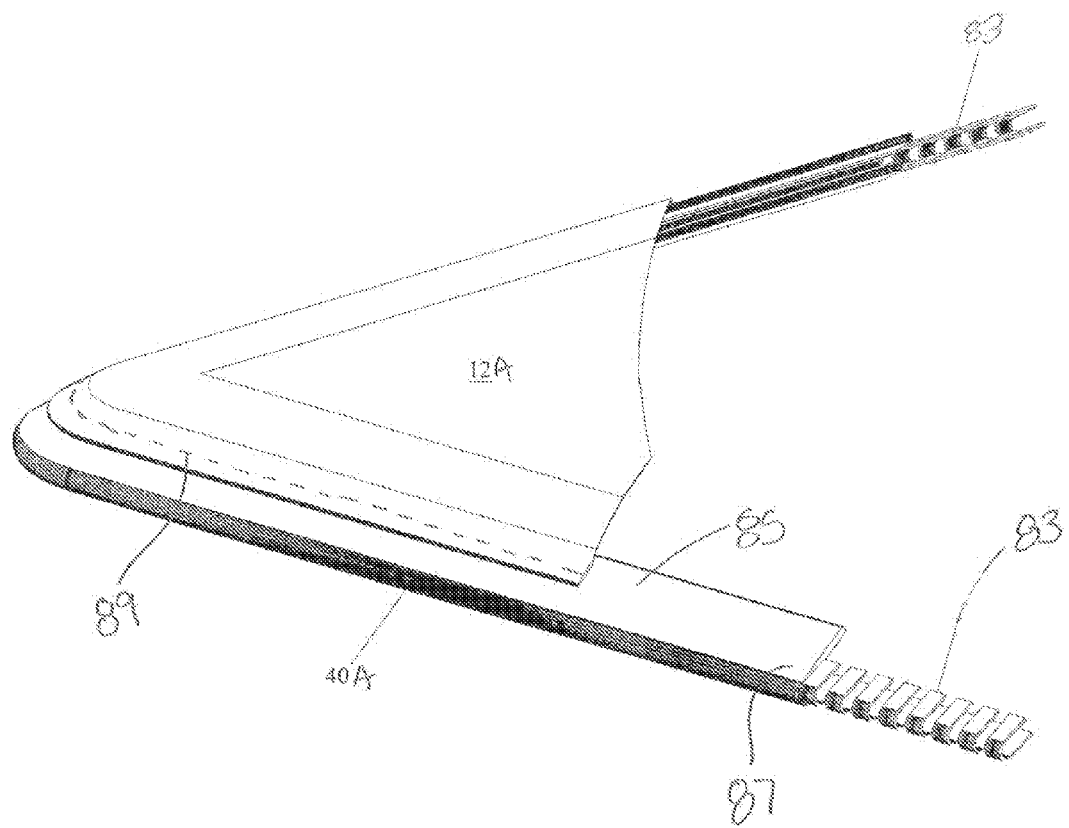
FIG. 21 is a partial, fragmentary view of the tonneau cover shown in FIG. 19 installed onto a cargo bed of a vehicle.
Figure 22:
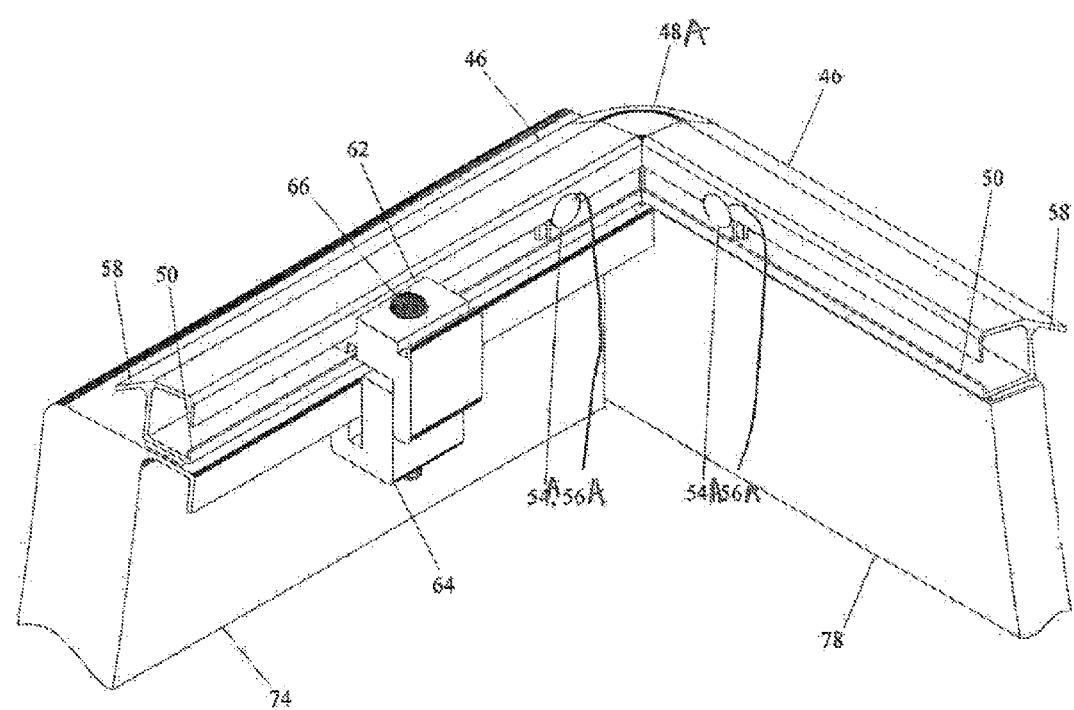
FIG. 22 is a partial, fragmentary view of the tonneau cover shown in FIG. 19 installed onto a cargo bed of a vehicle.
Figure 23:
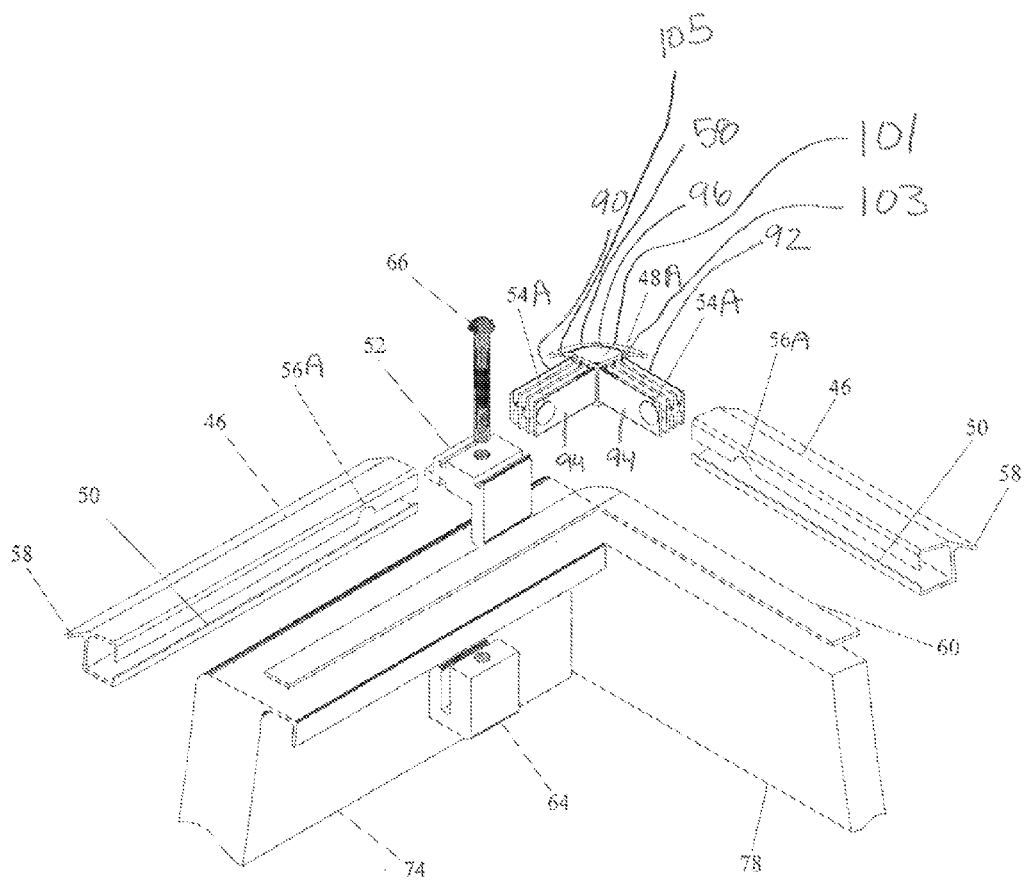
FIG. 23 is an exploded, partial, fragmentary view of the tonneau cover shown in FIG. 19 installed onto a cargo bed of a vehicle.
Figure 24:
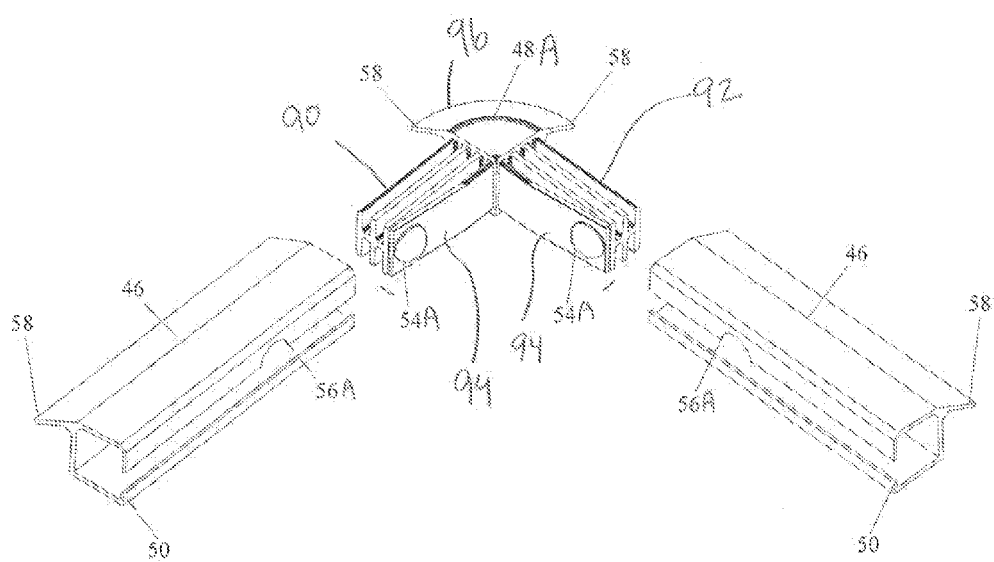
FIG. 24 is a partial, fragmentary view of the a rail of the tonneau cover shown in FIG. 19.
Figure 25:
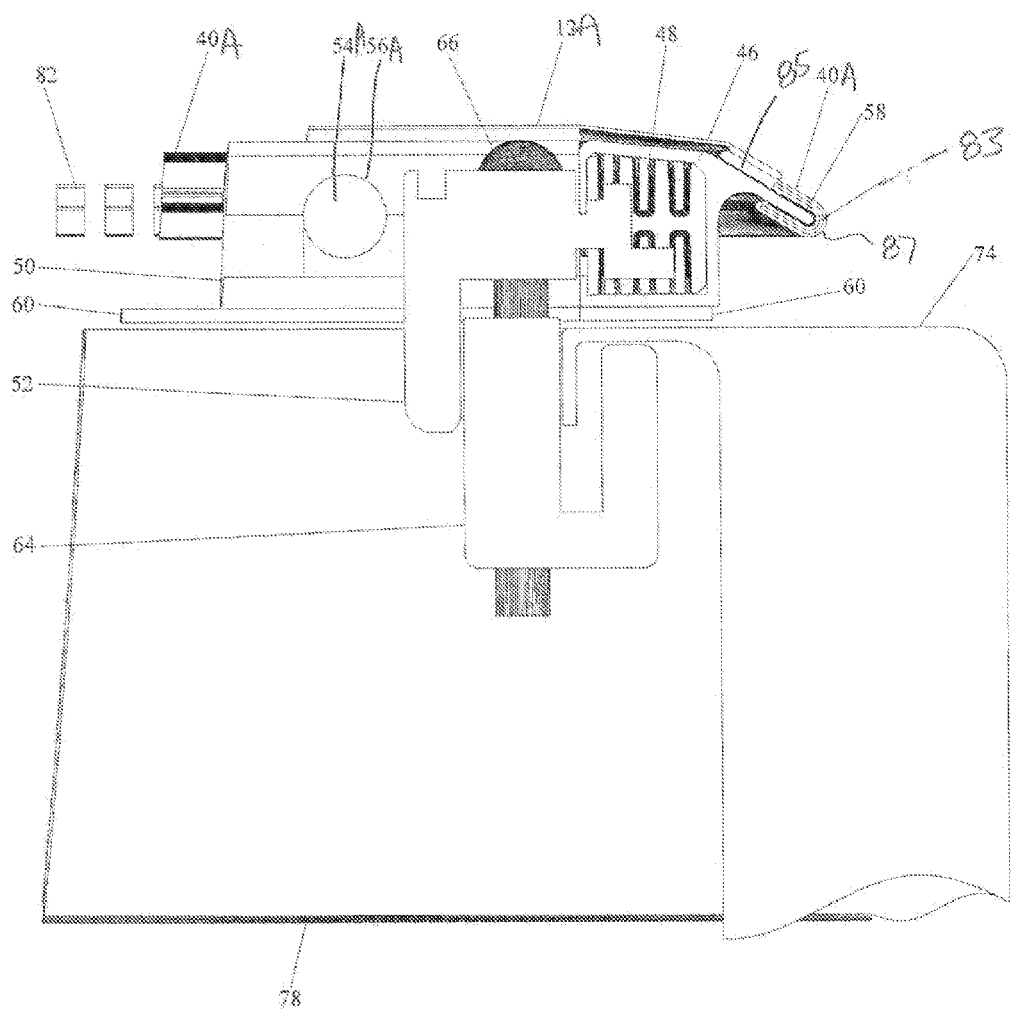
FIG. 25 is a cross sectional view of the tonneau cover shown in FIG. 19 installed onto a cargo bed of a vehicle.

Referring now to FIGS. 20, 21, 25 and 26, the J-clip 40A may include a tabbed portion 85 and a U-shaped portion 87. The tabbed portion 85 may be sewn to the outer edge of the cover 12A using stitches 89 as best seen in FIG. 21. The U-shaped portion 87 may engage the J-clip male portion 58 of the rails 46. Reinforcing members 83 may be disposed in an inner portion of the J-clip 40A. In an embodiment, the J-clip 40A may be formed of a flexible material, such as plastic or PVC. In an embodiment, the reinforcing members 83 disposed within the J-clip 40A may be formed of a metal, such as aluminum.

Figure 26:
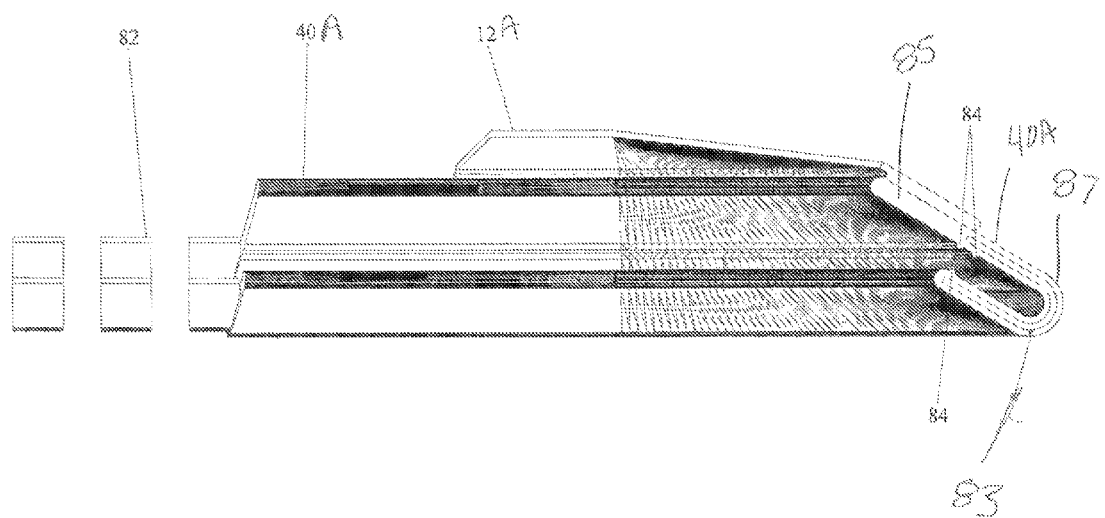
FIG. 26 is a partial, cross sectional view of the edge of the tonneau cover shown in FIG. 19.

Referring now to FIG. 26, an inner surface of the U-shaped portion 87 may include on or more protrusions 84 that engage a surface of the J-clip male portion 58. It will be appreciated that the protrusions 84 may abut against the top and bottom surfaces of the J-clip male portion 58. The protrusions 84 may form a seal with the J-clip male portion 58. In an embodiment, the seal formed by the protrusions 84 is airtight. In an embodiment, the seal formed by the protrusions 84 is watertight. In an embodiment, the seal formed by the protrusions 84 is substantially airtight. In an embodiment, the seal formed by the protrusions 84 is substantially watertight.

Referring now to FIGS. 19 and 22-25, the rail frame corners 48A interconnect the rails 46 at the corners of the cargo bed. As perhaps best seen in FIGS. 23 and 24, the rail frame corners 48A may include a first insert member 90 and a second insert member 92 extending from a base member 96. It will be appreciated that the first insert member 90 and the second insert member 92 may be disposed at an angle, such as a 90 degree angle, with respect to each other. The first insert member 90 and the second insert member 92 may be configured and adapted to be installed into the ends of the rails 46.

In an embodiment, the first insert member 90 and the second insert member 92 may each include a cantilevered portion 94. The cantilevered portions 94 may be flexible or deformable such that they can flex or deform in response to a force, typically applied by a user's hand. Disposed on the cantilevered portions 94 may be locking protrusions 54A. The protrusions 54A may be configured and adapted to engage cutouts 56A formed in the rails 46. In an embodiment, the protrusions 54A are cylindrical.

In particular, when the insert members 90 and 92 are installed into the ends of the rails 46, the cantilevered portions 94 may be slightly deformed. When the protrusions 54A align with the cutouts 56A in the rails 46, the cutouts 56A and the protrusions 54A may form a snap-fit lock to hold the corners 48A and the rails 46 together. To disengage the corners 48A from the rails 46, a force may be applied to the protrusions 54A to thereby deform the cantilevered portions 94.

In an embodiment, the base member 96 may include a J-clip male portion 58 for engaging the J-clip 40A secured to the cover 12A. The J-clip male portion 58 may extend from an outer perimeter from the top of the base member 96 such that the J-clip male portion 58 performs a 90 degree turn and forms a rounded corner. The base member 96 may further include a top portion 101 having a first edge 103 and a second edge 105 that form rail stops. In an embodiment, the base member 96 is formed from plastic.

It will be appreciated that the present invention can be utilized on a wide variety of vehicles, including pickup trucks, trailers, military vehicles, or any other type of vehicle with an exposed cargo space. In an embodiment, the flexible cover may be constructed from a vinyl, reinforced polyester, coated fabric, or a cotton material.

It will be appreciated that the structure and apparatus disclosed herein is merely one example of a means for expanding a tonneau cover, and it should be appreciated that any structure, apparatus or system for expanding a tonneau cover which performs functions the same as, or equivalent to, those disclosed herein are intended to fall within the scope of a means for expanding a tonneau cover, including those structures, apparatus or systems for expanding a tonneau cover which are presently known, or which may become available in the future. Anything which functions the same as, or equivalently to, a means for expanding a tonneau cover falls within the scope of this element.

Those having ordinary skill in the relevant art will appreciate the advantages provide by the features of the present disclosure. For example, it is a feature of the present disclosure to provide a tonneau cover that is operable between a collapsed position and an expanded position. It is further a feature of the present disclosure to provide tonneau cover with a plurality of folds. It is further a feature to provide a tonneau cover with self-retracting means.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A tonneau cover system mountable to a cargo area of a vehicle, the cargo area defined by vehicle sidewalls, said system comprising:
    a rail assembly comprising a plurality of rails, each of the plurality of rails having a cantilevered male portion extending therefrom;
    a flexible tonneau cover having a perimeter and a J-clip disposed along the perimeter, the tonneau cover having a first side and a second side intersecting at a corner;
    wherein the J-clip extends from the first side to the second side and traverses said corner of the tonneau cover;
    wherein the J-clip is configured and adapted to matingly engage the cantilevered male portions extending from the plurality of rails;
    wherein the J-clip comprises a plurality of internally disposed reinforcing members.

2. The system of claim 1, wherein the rail assembly further comprises a first pair of oppositely disposed rails and a second pair of oppositely disposed rails.

3. The system of claim 1, wherein the J-clip is attached to the flexible tonneau cover.

4. The system of claim 1, wherein the J-clip comprises a tabbed portion and a U-shaped portion.

5. The system of claim 4, wherein the U-shaped portion comprises an inner surface, wherein the inner surface comprises one or more protrusions.

6. The system of claim 5, wherein the one or more protrusions are configured and adapted to form a seal against the cantilevered male portions.

7. The system of claim 1, further comprising a plurality of clamps for securing the rail assembly to the vehicle sidewalls.

8. The system of claim 1, further comprising corner pieces for coupling two of the plurality of rails together at a 90 degree angle.

9. The system of claim 8, further comprising a means for locking the rails to the corner pieces.

10. The system of claim 1, wherein the reinforcing members are formed of metal.

11. The system of claim 10, wherein the metal is aluminum.

12. The system of claim 10, wherein the reinforcing members are U-shaped.

13. The system of claim of claim 1, wherein the J-clip continues without break around the perimeter of the tonneau cover.

14. A method of covering a cargo area of a vehicle, the cargo area defined by vehicle sidewalls having a top surface, said method comprising:
- securing a rail assembly to the top surface of the vehicle sidewalls, the rail assembly having a plurality of rails, each of the plurality of rails having a cantilevered male portion extending therefrom;
- providing a tonneau cover, the tonneau cover having a perimeter and a J-clip disposed along the perimeter, the tonneau cover having a first side and a second side intersecting at a corner, wherein the J-clip extends from the first side to the second side and traverses said corner;
- securing the tonneau cover to the rail assembly by engaging the J-clip with the cantilevered male portions of the plurality of rails;
- wherein the J-clip comprises a plurality of internally disposed reinforcing members.

15. The method of claim 14, wherein the J-clip is attached to the tonneau cover.

16. The method of claim 15, wherein the J-clip comprises a tabbed portion and a U-shaped portion wherein the U-shaped portion comprises an inner surface, wherein the inner surface comprises one or more protrusions, wherein the one or more protrusions are configured and adapted to form a seal against the cantilevered male portions.

17. The method of claim 14, wherein the J-clip continues without break around the perimeter of the tonneau cover.

18. A tonneau cover system mountable to a cargo area of a vehicle, the cargo area defined by vehicle sidewalls, said system comprising:
- a flexible tonneau cover comprising a first side and a second side intersecting at a corner; and
- means for securing the flexible tonneau cover to a rail assembly attached to the vehicle sidewalls;
- wherein the means for securing comprises a J-clip extending from the first side to the second side by traversing said corner;
- wherein the J-clip comprises a plurality of internally disposed reinforcing members.

* * * * *